(12) United States Patent
Chen (10) Patent No.: US 9,969,460 B1
(45) Date of Patent: May 15, 2018

(54) BICYCLE PEDAL FOR QUICKLY DISENGAGING FROM SHOE CLEAT

(71) Applicant: WELLGO PEDAL'S CORP., Taichung (TW)

(72) Inventor: Chung-I Chen, Taichung (TW)

(73) Assignee: Wellgo Pedal's Corp., Taichung (TW)

( * ) Notice: Subject to any disclaimer, the term of this patent is extended or adjusted under 35 U.S.C. 154(b) by 0 days. days.

(21) Appl. No.: 15/422,478

(22) Filed: Feb. 2, 2017

(51) Int. Cl.
*B62M 3/08* (2006.01)

(52) U.S. Cl.
CPC ................... *B62M 3/086* (2013.01)

(58) Field of Classification Search
CPC ...................................................... B62M 3/086
See application file for complete search history.

(56) References Cited

U.S. PATENT DOCUMENTS

| 8,720,305 B1 * | 5/2014 | Inoue | B62M 3/086 74/594.6 |
| 9,021,918 B2 * | 5/2015 | Inoue | B62M 3/086 74/594.6 |

FOREIGN PATENT DOCUMENTS

DE 202014101762 U1 * 4/2014 ............ B62M 3/086

* cited by examiner

*Primary Examiner* — Thomas C Diaz
(74) *Attorney, Agent, or Firm* — Rosenberg, Klein & Lee (57) ABSTRACT

A bicycle pedal includes a body having a fixed member, a movable member, a resilient unit and a link respectively connected to each of a first face and a second face thereof. The link and the resilient unit are respectively located on inside of the movable member. The link contacts the movable member. When the cleat of a bicycle shoe pushes the movable member and the link away from the body, the push end of the link swings away from the body and pushes the cleat to disengage from the peal. The link has a restriction portion located corresponding to outside of the end piece. The restriction portion extends from the link and toward the end piece to prevent the bolt from dropping from the end piece.

7 Claims, 7 Drawing Sheets

BICYCLE PEDAL FOR QUICKLY DISENGAGING FROM SHOE CLEAT

BACKGROUND OF THE INVENTION

1. Fields of the Invention

The present invention relates to a bicycle pedal, and more particularly, to a bicycle pedal for allowing the riders to quickly disengaging the shoe cleat from the pedal.

2. Descriptions of Related Art

The conventional step-in bicycle pedals are designed to allow the pedal to be securely connected with the cleats attached on the underside of the rider's shoes. Usually, the pedal includes frames so as to be connected to the cleat such that the rider's shoes are securely connected to the pedals and can efficiently tread the pedals to move the bicycle forward. One of the bicycle pedals known to the applicant includes a frame and a casing, and the rider first inserts the front end of the cleat on the underside of the bicycle shoes into a space between the frame and the casing of the pedal, and then the rear end of the cleat is then pressed downward to be engaged with two lugs and an adjustable plate to securely connect the shoe to the cleat. The rider can use a screwdriver to move a bolt to adjust the distance between the press plate and the adjustment portion, so that the user is able to disengage the cleat from the pedal by lifting an angle of the rear end of the shoe.

However, in some situations, such as races of the mountain bikes, bicycle motor-cross and dual slalom, the riders' shoes have to be disengaged from and then connected to the pedals frequently, the above mentioned pedals can only assist the bicycle shoes to be connected to the pedals, but cannot conveniently assist the shoes to remove the bicycle shoes from the pedals.

Besides, when the riders lean an angle, the users sometimes have to remove the shoes from the pedals and touch the ground to keep balance and then quickly re-connect the shoes to the pedals. The above mentioned pedals cannot provide this feature.

Furthermore, the bolt may be loosened and lost under severe vibration during riding.

The present invention intends to provide a bicycle pedal which allows the user's shoes to be quickly connected to and disengaged from the pedal so as to improve the shortcomings mentioned above.

SUMMARY OF THE INVENTION

The present invention relates to a bicycle pedal and comprises a body having an axle about which the body is rotated. The axle is connected to the crank shaft of a bicycle. The body has a first face on the first side thereof. A fixed member is connected to the first face. A movable member has an extension extending laterally therefrom. Two lugs respectively extend from two ends of the movable member. A pin extends through the two lugs and is connected to the second side of the body. An end piece extends from the distal end of the extension and toward the body. A resilient unit is connected between the two lugs and the end piece, wherein the resilient unit biases the movable member toward the body. A link has a push end on the first end thereof. The pin extends through the middle portion of the link. The link is located between the two lugs and contacts the extension of the movable member.

Preferably, the resilient unit includes a bolt, a plate and two torsion springs. The two torsion springs each have a leg and are mounted to the pin. The bolt extends through the end piece, and the threaded section of the bolt is located between the two lugs and threadedly connected to the plate. The two respective legs respectively contact the body and the plate, and push the movable member toward the body so as to be engaged with the cleat of a shoe. The bolt drives the plate to adjust a force of the torsion springs to the movable member.

Preferably, the link includes a hole defined through the middle portion thereof and located between the two torsion springs. The push end extends toward the body.

Preferably, the body includes a second face which is located opposite to the first face. Another fixed member, another movable member, another resilient unit and another link are connected to the second face.

The present invention provides another bicycle pedal which comprises a body having an axle about which the body is rotated. The axle is connected to the crank shaft of a bicycle. The body has a first face on the first side thereof. A fixed member is connected to the first face. A movable member has an extension extending laterally therefrom. Two lugs respectively extend from two ends of the movable member. A pin extends through the two lugs and is connected to the second side of the body. An end piece extends from the distal end of the extension and toward the body. A resilient unit is connected between the two lugs and the end piece. The resilient unit has a bolt which extends through the end piece. The resilient unit biases the movable member toward the body. A link has a push end on the first end thereof. The pin extends through the middle portion of the link. The link is located between the two lugs and contacting the extension of the movable member. The link has a restriction portion which is located corresponding to the outside of the end piece. The restriction portion extends from the link and toward the end piece to prevent the bolt from dropping from the end piece.

Preferably, the resilient unit includes a bolt, a plate and two torsion springs. The two torsion springs each have a leg and are mounted to the pin. The bolt extends through the end piece, and the threaded section of the bolt is located between the two lugs and threadedly connected to the plate. The two respective legs respectively contact the body and the plate, and push the movable member toward the body so as to be engaged with the cleat of a shoe. The bolt drives the plate to adjust a force of the torsion springs to the movable member.

Preferably, the link includes a hole defined through the middle portion thereof and located between the two torsion springs. The push end extends toward the body.

Preferably, the body includes a second face which is located opposite to the first face. Another fixed member, another movable member, another resilient unit and another link are connected to the second face.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, the bicycle pedal of the present invention comprises a body 1 having an axle 13 which is connected to a crank shaft of a bicycle. The body 1 is rotated about the axle 13. The body 1 has a first face 11 on the first side thereof. A fixed member 2 is connected to the first face 11. A movable member 3 has an extension 31 extending laterally therefrom, and two lugs 32 respectively extend from two ends of the movable member 3. A pin 33 extends through the two lugs 32 and is connected to the second side of the body 1. An end piece 311 extends from the distal end of the extension 31 and toward the body 1. A resilient unit 4 is connected between the two lugs 32 and the end piece 311. The resilient unit 4 biases the movable member 3 toward the body 1 so as to engage with the cleat 101 or to be disengaged from the cleat 101. A link 5 has a push end 51 on the first end thereof. The pin 33 extends through the middle portion of the link 5. The link 5 is located between the two lugs 32 and contacts the extension 31 of the movable member 3.

When in use, the rider guides one end of the cleat 101 of the bicycle shoe 100 to be engaged with the fixed member 2 and steps downward toward the body 1. The other end of the cleat 101 pushes the movable member 3 away from the body 1 and is then engaged with inside of the movable member 3. The resilient unit 4 resiliently supports the movable member 3 to return to be engaged with the cleat 101. The cleat 101 swings to push the movable member 3 and the link 5 away from the body 1, and the push end 51 of the link 5 swings away from the body 1 and pushes the cleat 101 to be disengaged from the pedal.

Specifically, the resilient unit 4 includes a bolt 41, a plate 42 and two torsion springs 43. The two torsion springs 43 each have a leg 431 and are mounted to the pin 33. The bolt 41 extends through the end piece 311, and the threaded section of the bolt 41 is located between the two lugs 32 and threadedly connected to the plate 42. The two respective legs 431 respectively contact the body 1 and the plate 42, and push the movable member 3 toward the body 1 so as to be engaged with the cleat 101 of the bicycle shoe 100. The bolt 41 drives the plate 42 axially to adjust the force of the torsion springs 43 to the movable member 3.

The link 5 includes a hole 52 defined through the middle portion thereof and located between the two torsion springs 43. The push end 51 extends toward the body 1. It is noted that the body 1 includes a second face 12 which is located opposite to the first face 11, another fixed member 2, another movable member 3, another resilient unit 4 and another link 5 are connected to the second face 12.

Figure 1:
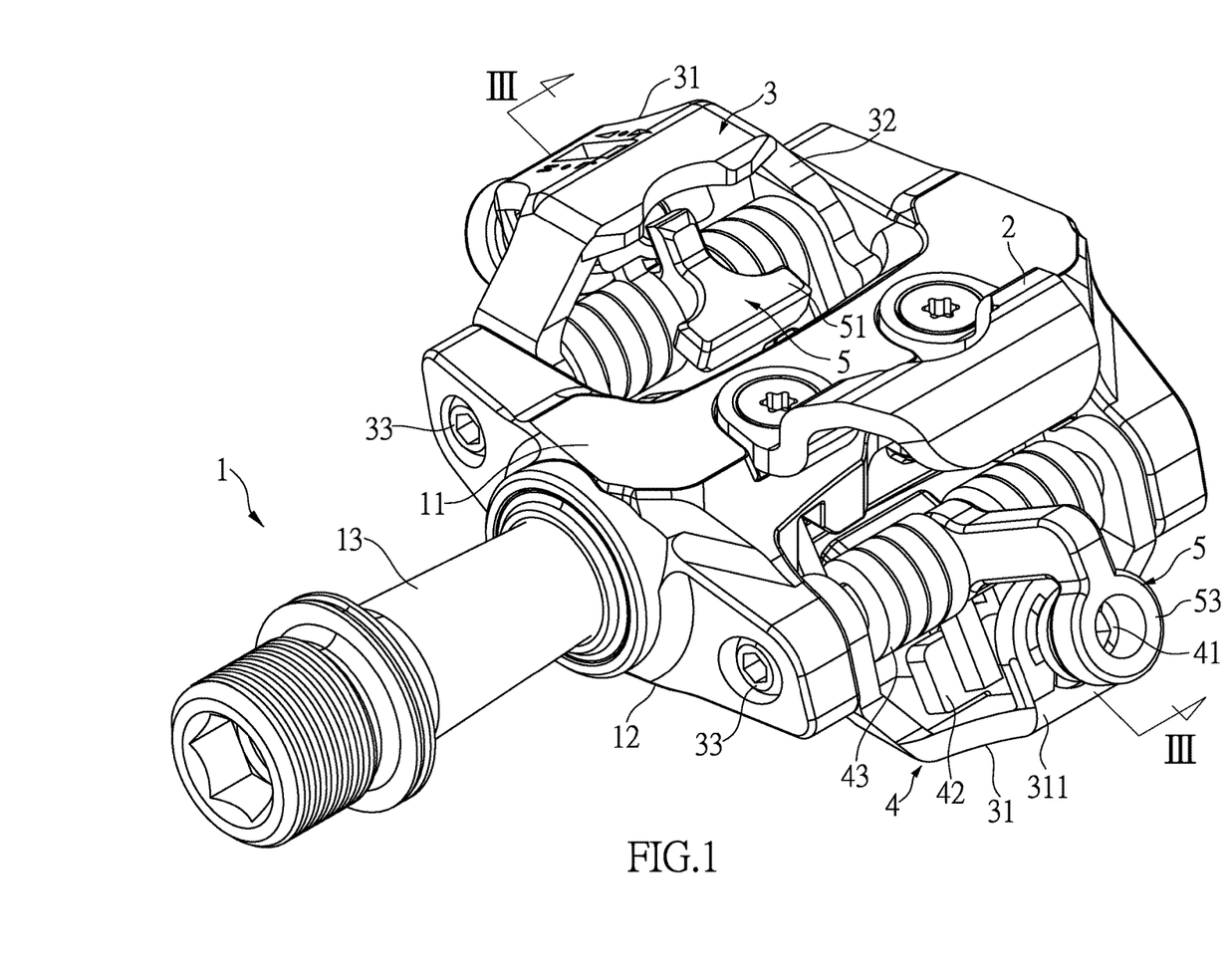
FIG. 1 is a perspective view to show the bicycle pedal of the present invention.
Figure 2:
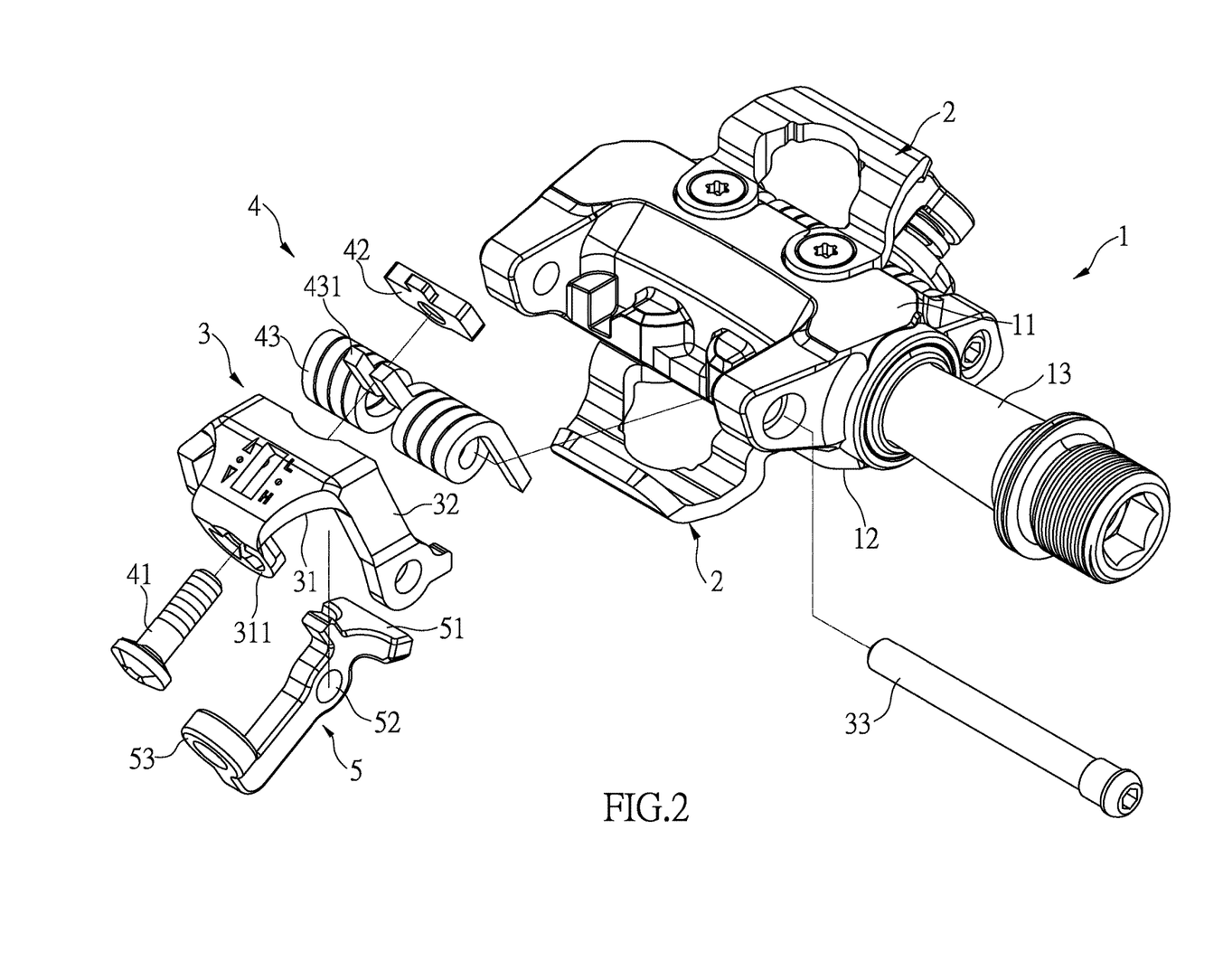
FIG. 2 is an exploded view of the bicycle pedal of the present invention.
Figure 3:
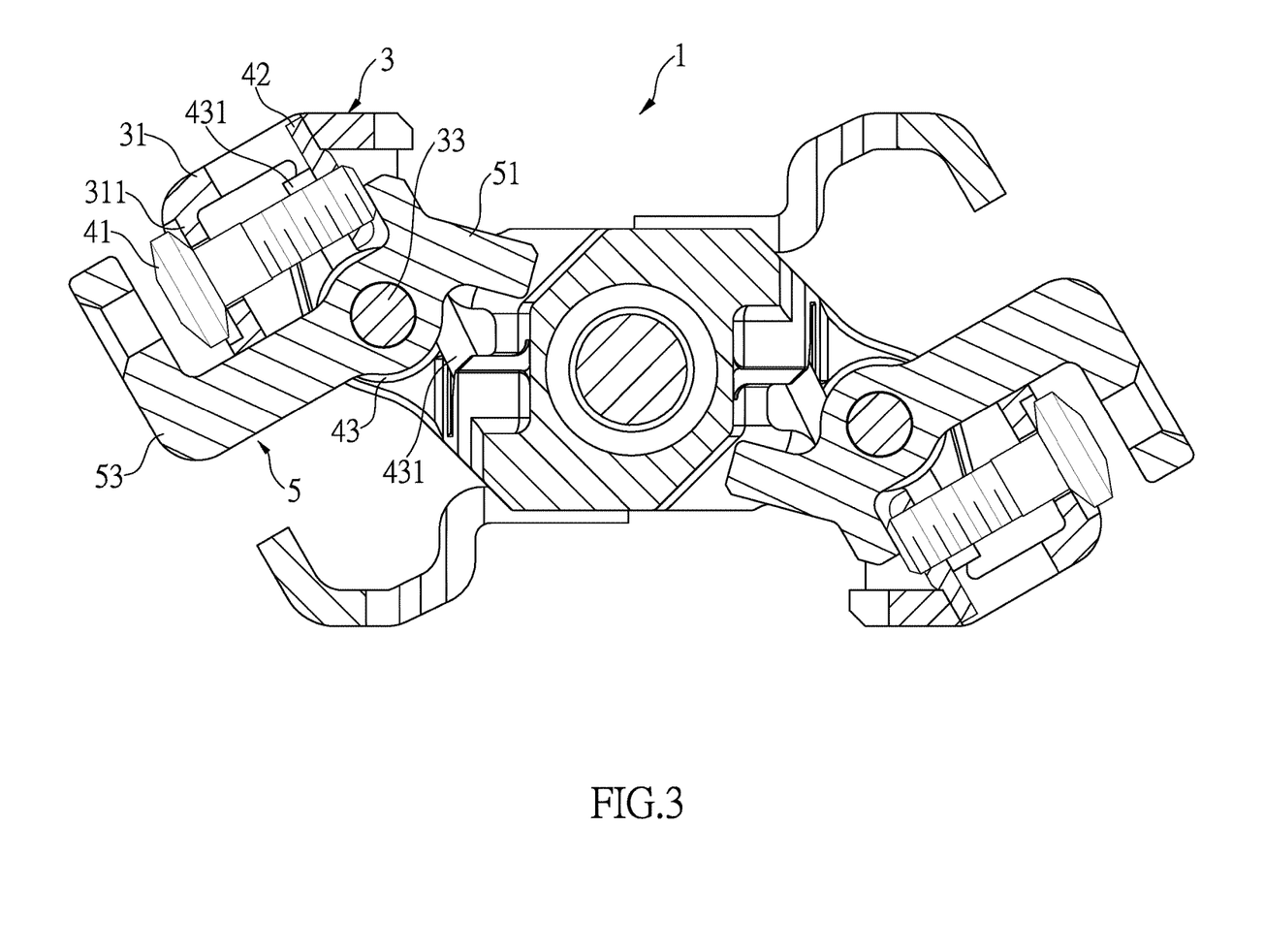
FIG. 3 is a cross sectional view of the bicycle pedal of the present invention.
Figure 4:
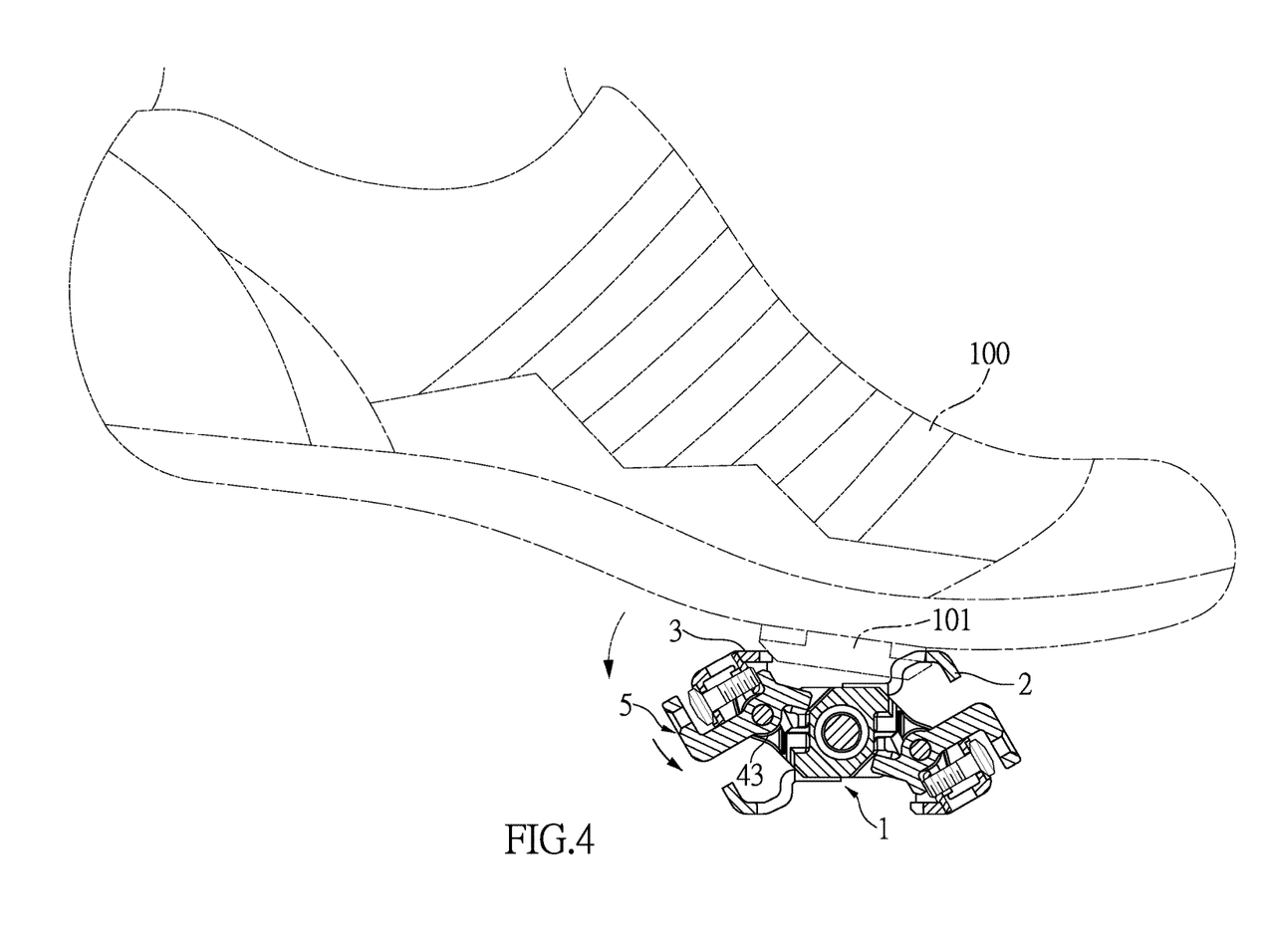
FIG. 4 is a cross sectional view to show that the movable member of the present invention is to be engaged with the shoe cleat.
Figure 5:
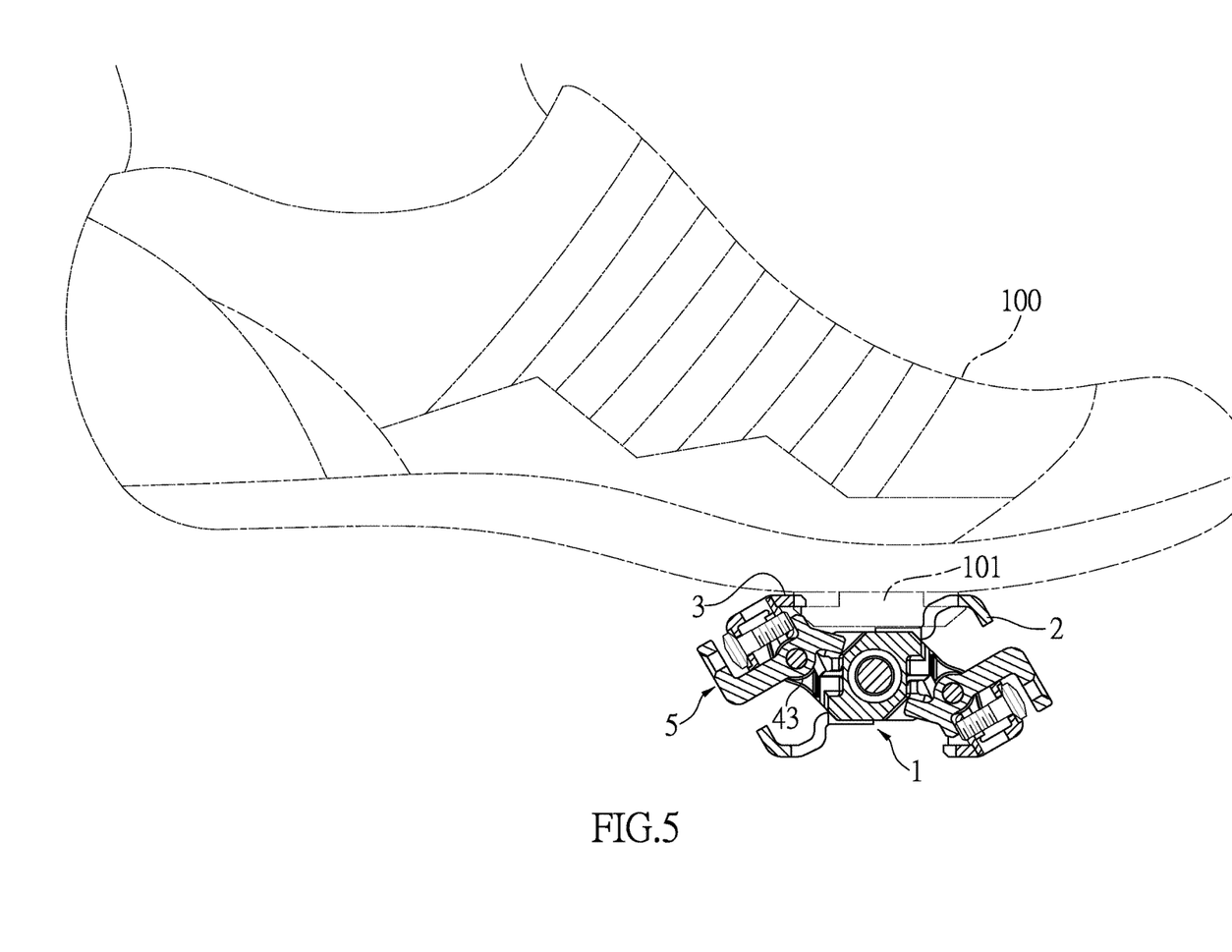
FIG. 5 is a cross sectional view to show that the movable member of the present invention is engaged with the shoe cleat.

When in use, as shown in FIGS. 4 and 5, the rider guides one end of the cleat 101 of the bicycle shoe 100 to be engaged with the fixed member 2 and steps downward toward the body 1 as shown by the arrowheads in FIG. 4.

The other end of the cleat 101 includes an inclined face which pushes the movable member 3 away from the body 1 to compress the torsion springs 43 and is then engaged with inside of the movable member 3. The resilient unit 4 resiliently supports the movable member 3 to return to be engaged with the cleat 101. This helps the rider to operate the bicycle pedal when operating mountain bikes, bicycle motor-cross and dual slalom. The angle of the push end 51 is specifically design which does not affect the engagement between the cleat 101 and the movable member 3 when the inclined face of the cleat pushes the movable member 3 away from the body 1 and lift the push end 51.

Figure 6:
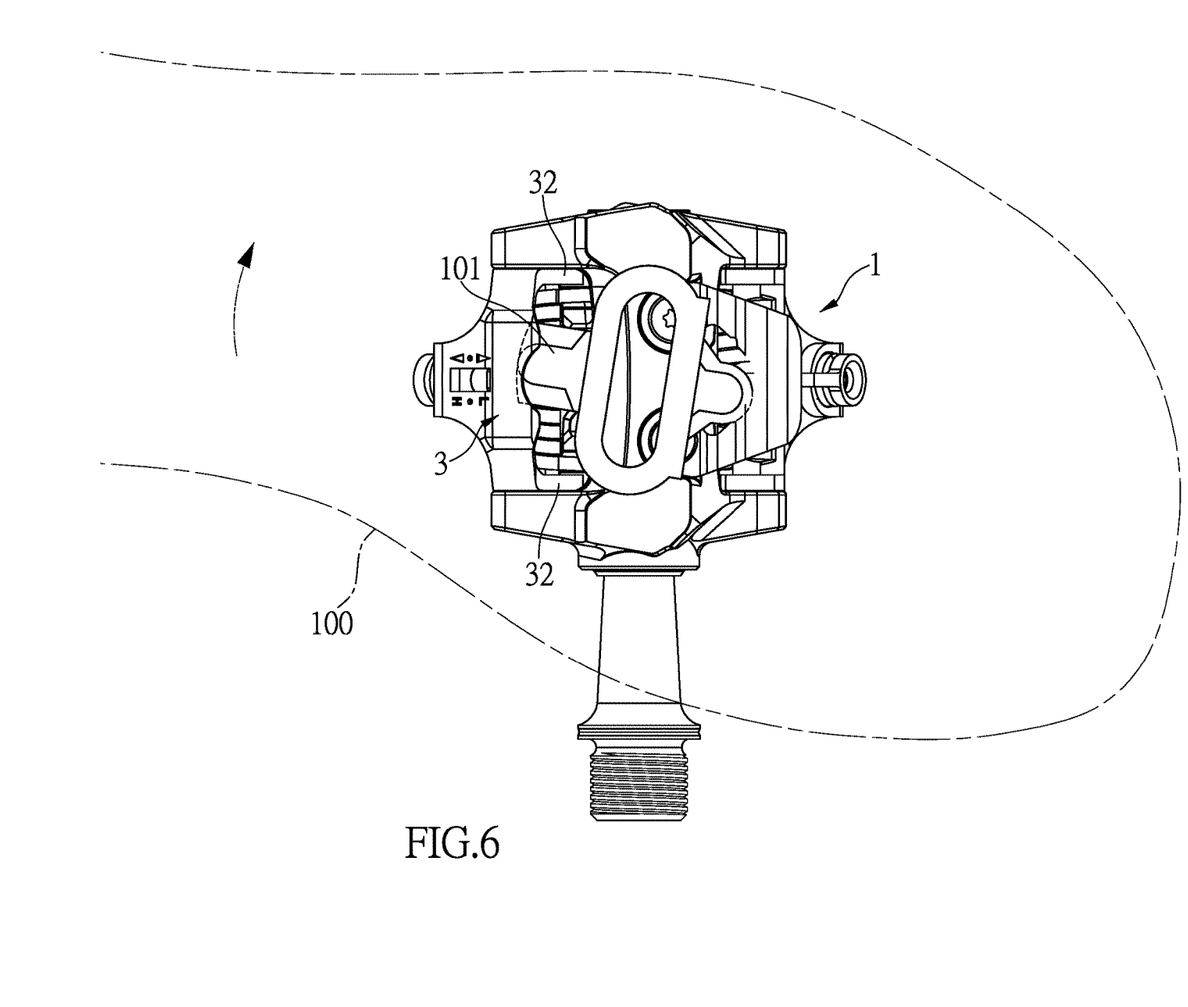
FIG. 6 shows that the movable member is pushed away from the body due to the movement of the shoe cleat.
Figure 7:
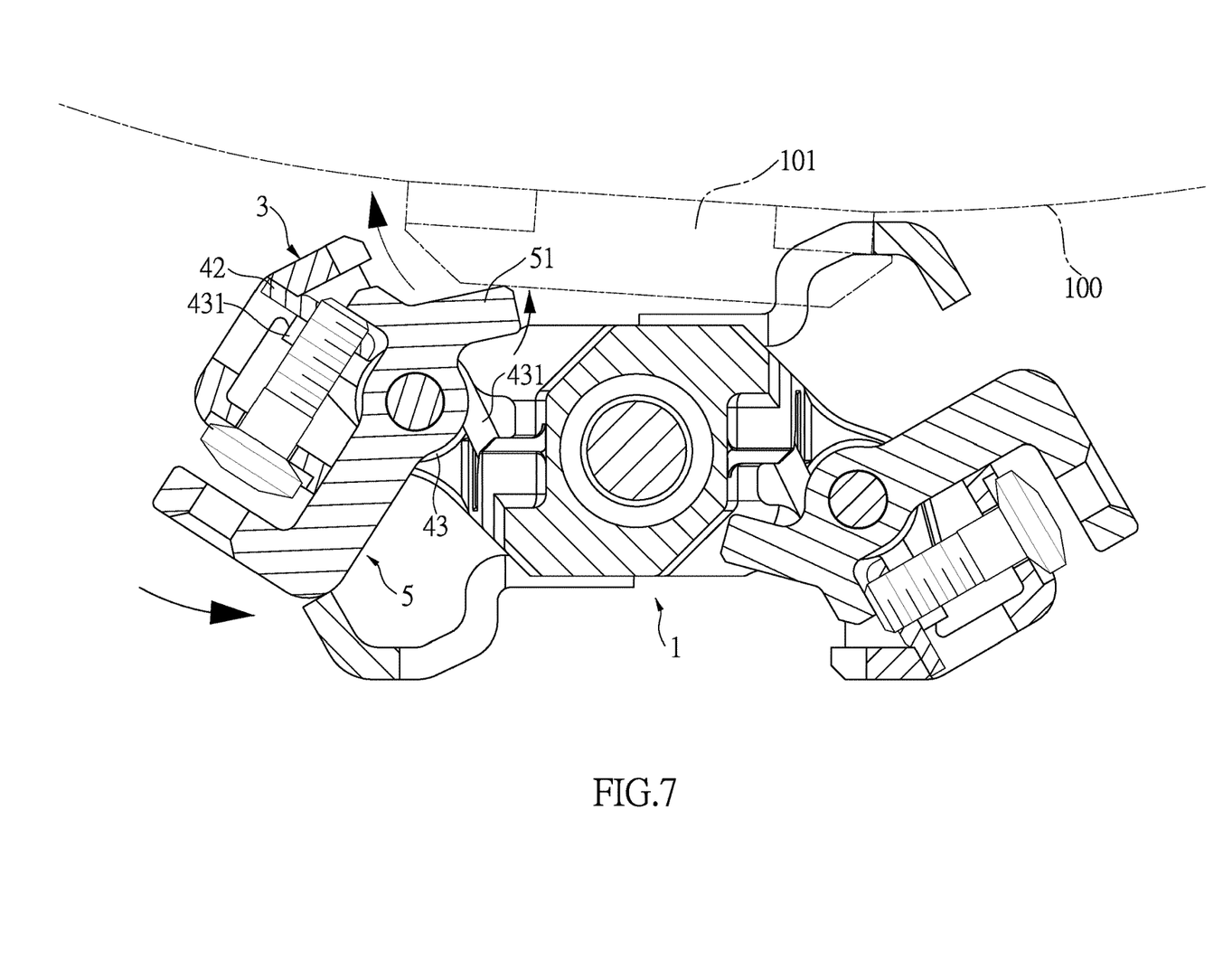
FIG. 7 shows that the push end of the link swings away from the body and pushes the shoe cleat away so as to assist the shoe cleat to be disengaged from the pedal.

As shown in FIGS. 5 to 7, when the rider wants to disengage the cleat 101 from the body 1, the cleat 101 swings along the direction shown by the arrowhead in FIG. 6 so that the cleat 101 swings to push the movable member 3 and the link 5 away from the body 1, and the push end 51 of the link 5 swings away from the body 1 and pushes the cleat 101 to be disengaged from the pedal. The push end 51 swings away from the body 1 and pushes the cleat 101 outward as shown in the arrowhead in FIG. 7. Therefore, the cleat 101 is quickly disengaged from the body 1.

The present invention further provides another embodiment, the difference from the previous embodiment is that the link 5 has a restriction portion 53 which is located corresponding to outside of the end piece 311. The restriction portion 53 extends from the link 5 and toward the end piece 311 to prevent the bolt 41 from dropping from the end piece 311.

The advantages of the present invention are that the cleat 101 transversely pushes the movable member 3 to swing the movable member 3 and the link 5 to swing away from the body 1. The push end 51 of the link 5 swings away from the body 1 to push the cleat 101 outward so that the cleat 101 is easily disengaged from the pedal.

The cleat 101 is able to disengage from the pedal when the bicycle falls, so that the rider can quickly stand on the ground to keep balance.

The link 5 includes a restriction portion 53 which is bent toward outside of the end piece 311 of the movable member 3 so as to prevent the bolt 41 dropping from the movable member 3.

While we have shown and described the embodiment in accordance with the present invention, it should be clear to those skilled in the art that further embodiments may be made without departing from the scope of the present invention.

What is claimed is:

1. A bicycle pedal comprising:
   a body (1) having an axle (13) about which the body (1) is rotated, the axle (13) is adapted to be connected to a crank shaft of a bicycle, the body (1) having a first face (11) on a first side thereof;
   a fixed member (2) connected to the first face (11);
   a movable member (3) having an extension (31) extending laterally therefrom, two lugs (32) respectively extending from two ends of the movable member (3), a pin (33) extending through the two lugs (32) and connected to a second side of the body (1), an end piece (311) extending from a distal end of the extension (31) and toward the body (1);
   a resilient unit (4) connected between the two lugs (32) and the end piece (311), the resilient unit (4) including a bolt (41), a plate (42) and two torsion springs (43), the two torsion springs (43) each having a leg (431) and mounted to the pin (33), the bolt (41) extending through the end piece (311), a threaded section of the bolt (41)

being located between the two lugs (32) and threadedly connected to the plate (42), the two respective legs (431) respectively contacting the body (1) and the plate (42), and pushing the movable member (3) toward the body (1) so as to be adapted to be engaged with a cleat (101) of a shoe (100), the bolt (41) drives the plate (42) to adjust a force of the torsion springs (43) to the movable member (3), and a link (5) having a push end (51) on a first end thereof, the pin (33) extending through a middle portion of the link (5), the link (5) located between the two lugs (32) and contacting the extension (31) of the movable member (3).

2. The bicycle pedal as claimed in claim 1, wherein the link (5) includes a hole (52) defined through the middle portion thereof and located between the two torsion springs (43), the push end (51) extends toward the body (1).

3. The bicycle pedal as claimed in claim 1, wherein the body (1) includes a second face (12) which is located opposite to the first face (11), another fixed member (2), another movable member (3), another resilient unit 4 and another link (5) are connected to the second face (12).

4. A bicycle pedal comprising:
a body (1) having an axle (13) about which the body (1) is rotated, the axle (13) is adapted to be connected to a crank shaft of a bicycle, the body (1) having a first face (11) on a first side thereof;

a fixed member (2) connected to the first face (11);

a movable member (3) having an extension (31) extending laterally therefrom, two lugs (32) respectively extending from two ends of the movable member (3), a pin (33) extending through the two lugs (32) and connected to a second side of the body (1), an end piece (311) extending from a distal end of the extension (31) and toward the body (1);

a resilient unit (4) connected between the two lugs (32) and the end piece (311), the resilient unit (4) having a bolt (41) which extends through the end piece (311), the resilient unit (4) biasing the movable member (3) toward the body (1), and a link (5) having a push end (51) on a first end thereof, the pin (33) extending through a middle portion of the link (5), the link (5) located between the two lugs (32) and contacting the extension (31) of the movable member (3), the link (5) having a restriction portion (53) which is located corresponding to an outside of the end piece (311), the restriction portion (53) extends from the link (5) and toward the end piece (311) to prevent the bolt (41) from dropping from the end piece (311).

5. The bicycle pedal as claimed in claim 4, wherein the resilient unit (4) includes the bolt (41), a plate (42) and two torsion springs (43), the two torsion springs (43) each have a leg (431) and mounted to the pin (33), the bolt (41) extends through the end piece (311), a threaded section of the bolt (41) is located between the two lugs (32) and threadedly connected to the plate (42), the two respective legs (431) respectively contact the body (1) and the plate (42), and push the movable member (3) toward the body (1) so as to adapted to be engaged with a cleat (101) of a shoe (100), the bolt (41) drives the plate (42) to adjust a force of the torsion springs (43) to the movable member (3).

6. The bicycle pedal as claimed in claim 5, wherein the link (5) includes a hole (52) defined through the middle portion thereof and located between the two torsion springs (43), the push end (51) extends toward the body (1).

7. The bicycle pedal as claimed in claim 4, wherein the body (1) includes a second face (12) which is located opposite to the first face (11), another fixed member (2), another movable member (3), another resilient unit (4) and another link (5) are connected to the second face (12).

\* \* \* \* \*